Jan. 9, 1951  R. R. BRAUN, JR  2,537,258
BICYCLE SIDECAR

Filed April 19, 1947  2 Sheets—Sheet 1

INVENTOR
ROY R. BRAUN JR.

BY

ATTORNEYS

Jan. 9, 1951     R. R. BRAUN, JR     2,537,258
BICYCLE SIDECAR
Filed April 19, 1947     2 Sheets-Sheet 2
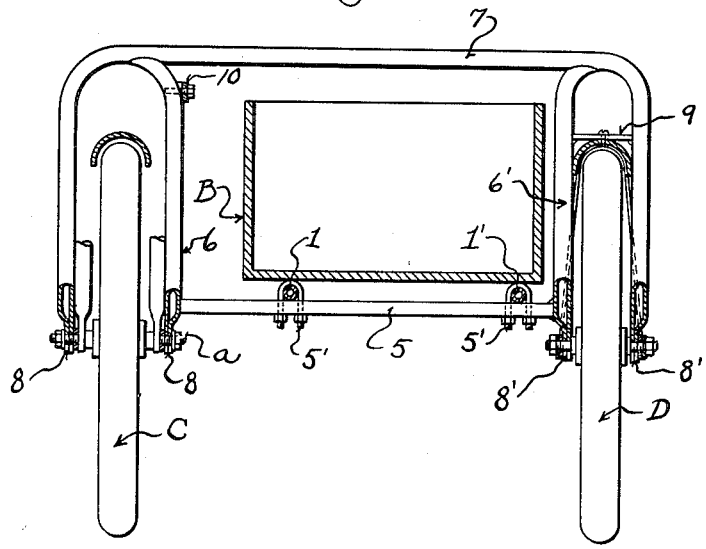
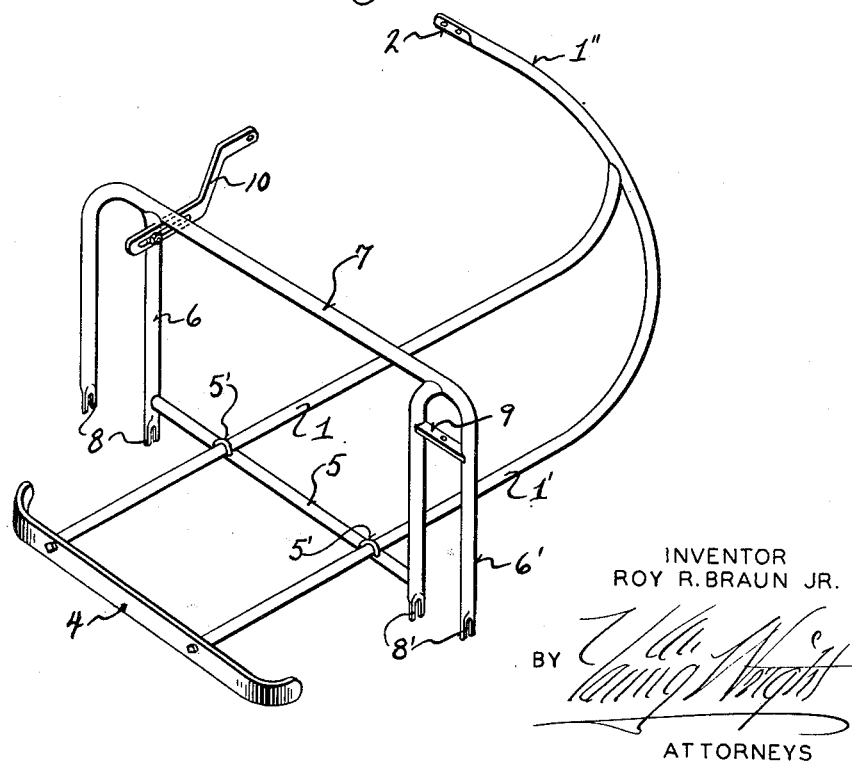
INVENTOR
ROY R. BRAUN JR.
BY
ATTORNEYS

Patented Jan. 9, 1951

2,537,258

UNITED STATES PATENT OFFICE 2,537,258

BICYCLE SIDECAR

Roy R. Braun, Jr., Milwaukee, Wis.

Application April 19, 1947, Serial No. 742,539

1 Claim. (Cl. 280—203)

My invention refers to side-cars, and it has for its object to provide a simple light weight skeleton side-car frame, attachable to any standard bicycle in a short time by those un-killed in the art of mechanics. Hence, it is attached by simply manipulating a few bolts, whereby the frame is rigidly secured to the steering head and rear wheel axle of a bicycle.

It is understood that the side-car frame may have any type or size of box secured thereto, whereby various packages or articles can be transported and delivered, for example to drug stores or the like. The frame may also be provided with a standard seat equipped body for transporting passengers.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings:

Figure 3 is a detailed fragmentary sectional view through the seat post collar of the bicycle, illustrating means for connecting a bracing tie rod from the seat post to the inner fork of the side-car frame.

Figure 4 is a similar detailed sectional view through the steering wheel head of the bicycle, illustrating a clamp connection between said head and the front end of the bicycle frame, particularly illustrating a rear wheel axle connection between said frame, the section being indicated by line 5—5 of Figure 2.

Figure 5 is a transverse sectional view through the bicycle and side car taken on the line 5—5 of Figure 2, looking in the direction of the arrows.

Figure 6 is a perspective view of the skeleton frame detached from a bicycle.

Figure 1:
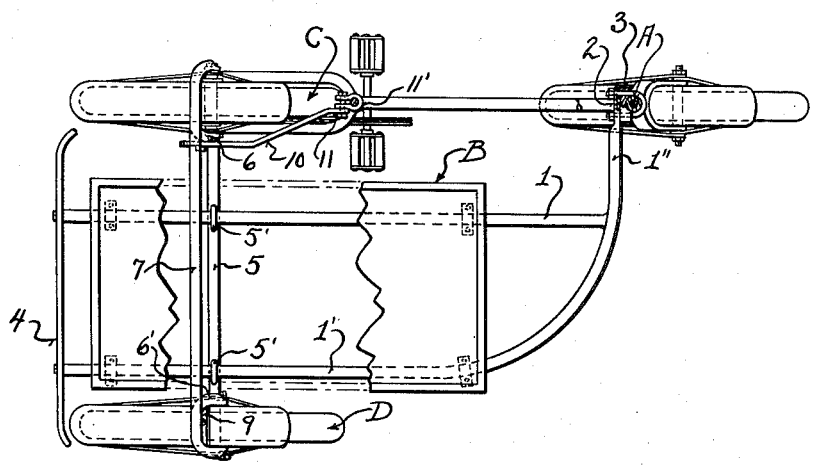
Figure 1 is a plan view of a bicycle having attached thereto a side-car embodying the features of my invention partly in section as indicated by line 1—1 of Figure 2.
Figure 2:
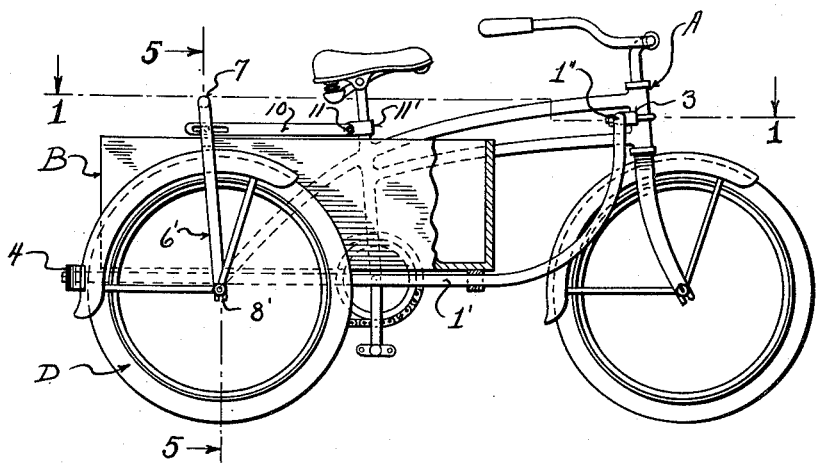
Figure 2 is a side elevation of the same looking towards the bicycle.
Figure 2:
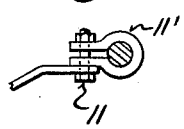
Figure 2:
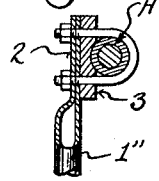

Referring by characters to the drawings 1 and 1' illustrate parallel struts of the frame, which struts at their front ends are merged and welded together. The outer strut is bowed inwardly and terminates with an apertured tongue 2 for attachment to the steering head A of a bicycle, the seat extension forming a draft neck 1".

As best illustrated in Figure 4, a U-shaped clamping bolt and its associated block 3 has its bolt ends secured through the tongue apertures as shown.

The rear ends of the struts 1 and 1' have secured thereto a bumper brace 4, which brace serves also as a reinforcement to add rigidity to a frame, which is fabricated from extremely light tubular material.

Mounted upon the struts 1 and 1' intermediate their ends is a cross-bar 5, adjustably secured to the struts by U bolts 5', it being understood, however, such adjustment is for the purpose of varying the frame to meet minor conditions in standard bicycles.

In some instances, however, I may spot weld this cross-bar.

Mounted upon the ends of the cross-bar is a pair of vertically disposed wheel forks 6 and 6' and said forks at their upper ends are secured together by a transversely disposed overhead bracing tube 7.

It is understood that this bracing tube, which is shown positioned over a carrying box B, may be connected to the companion inner fork members and extended rearwardly about the box for clearance, whereby full access is had to said box mouth.

The ends of the forks terminate with pairs of aligned axle sockets 8 and 8' into which the outer pair of said axle sockets, a side-car wheel is fitted. The inner pair of forks 6, as best shown in Figure 5, are rigidly secured to the ends of the rear axle $a$, upon which is mounted the wheel C of a bicycle provided with the usual mud guard, it being noted that the standard companion side wheel D of the side-car is similarly mounted upon the outer forks 6' and carries the usual mud guard D', which mud guard is secured to the associated wheel fork by a bridge piece 9.

In order to provide an intermediate connection between the skeleton frame and the bicycle, a tie rod 10, having a rear slotted end for adjustment purposes, is secured to the outer set of the fork 6 and its inner apertured end is fastened by a clip bolt 11 forming a part of a collar 11', which collar is secured to the said post for the purpose of adjusting the same.

Briefly, the side-car comprises a lower longitudinally disposed frame having parallel stretches, and an upper transversely disposed rectangular frame including vertically positioned wheel forks rigidly connected by parallel brace tubes, the upper or overhead tube being merged into the throats of the forks, while the lower tube or brace bar is merged into the ends of the inner fork legs, whereby a rigid unit is developed that may be adjustably secured to the parallel stretches of the lower frame for variation in fitting the side-car frame unit to a standard bicycle.

From the foregoing, it will be apparent that the skeleton frame may quickly be adjusted to a standard bicycle by manipulating a few bolts, whereby said frame is attached and rigidly secured to form a bar, with reference to the drag weight of said side-car.

I claim:

A side-car for attachment to a bicycle, comprising a rigid one-piece lower frame having longitudinally disposed parallel struts merged at their front ends with one of the struts extending forwardly and inwardly to form a draft neck adapted to be secured to a bicycle frame, a second one-piece transversely disposed rectangular frame having a pair of vertically disposed wheel supporting forks, the said frame wheel forks having an overhead brace tube rigidly connecting the throats of said forks, a second lower brace tube in parallel relation with the overhead brace tube and rigidly secured to the inner legs of said forks, bolts adjustably clamping the lower brace tube to the parallel struts of the first mentioned frame, a tie rod extending from the throat of the inner fork, adapted to be connected to the frame of a bicycle, and a parcel carrying box nested within the two side-car frames, the bottom of said box being connected at its front and rear end to the longitudinally disposed struts of the lower side-car frame, whereby the same is further braced under load strain.

ROY R. BRAUN, Jr.

REFERENCES CITED

The following references are of record in the file of this patent:

UNITED STATES PATENTS

| Number | Name | Date |
|---|---|---|
| 1,094,777 | Buckland | Apr. 28, 1914 |
| 1,302,476 | Simons | Apr. 29, 1919 |

FOREIGN PATENTS

| Number | Country | Date |
|---|---|---|
| 47,509 | Sweden | June 10, 1918 |
| 133,670 | Great Britain | July 18, 1919 |